United States Patent [19]

Tomiyori et al.

[11] Patent Number: 4,568,315
[45] Date of Patent: Feb. 4, 1986

[54] SPEED-SHIFTING PULLEY WITH CLUTCH MECHANISM

[75] Inventors: Takashi Tomiyori, Suzurandainishi; Hideo Hirai, Kakogawa, both of Japan

[73] Assignee: Mitsuboshi Belting Ltd., Kobe, Japan

[21] Appl. No.: 575,027

[22] Filed: Jan. 30, 1984

[30] Foreign Application Priority Data

Feb. 18, 1983 [JP] Japan ............................. 58-23373[U]

[51] Int. Cl.$^4$ ............................................. F16H 11/06
[52] U.S. Cl. ........................................ 474/17; 474/43; 384/449
[58] Field of Search ...................... 474/17, 43, 44, 46, 474/69, 74, 91; 384/449; 308/3.8

[56] References Cited

U.S. PATENT DOCUMENTS

| 1,045,523 | 11/1912 | Cossey | 308/3.8 |
| 3,916,707 | 11/1975 | Wells | 474/43 X |
| 4,075,902 | 2/1978 | Charchian et al. | 474/44 |
| 4,328,998 | 5/1982 | Manson | 308/3.8 |
| 4,384,387 | 5/1983 | Pachuta | 384/449 |
| 4,464,144 | 8/1984 | Kobayashi | 474/43 X |

Primary Examiner—Stephen I. Novosad
Assistant Examiner—Thuy M. Bui
Attorney, Agent, or Firm—Wood, Dalton, Phillips, Mason & Rowe

[57] ABSTRACT

A variable speed pulley mounted to a torque transmission shaft having an idler structure arranged to maintain the power transmission belt centered between the pulley sheaves when the sheaves are spaced apart sufficiently to permit the belt to ride on the idler as in a stopped or idling condition of the pulley system. A tension roller may be utilized in the system for urging the belt against the outer surface of the idler, which, in the illustrated embodiment, is crowned. Structure is provided for affording facilitated adjustable movement of the adjustable sheave on the shaft, and in one embodiment, provision is made for providing lubrication therebetween.

21 Claims, 8 Drawing Figures

FIG. 1 PRIOR ART
FIG. 2 PRIOR ART
FIG. 4
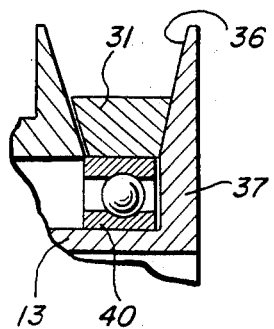
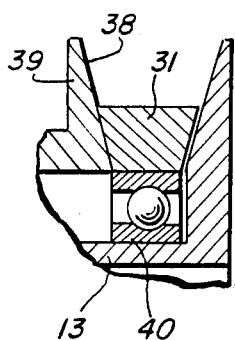
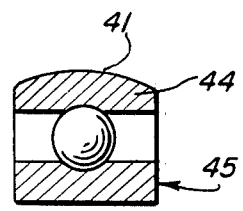
FIG. 3
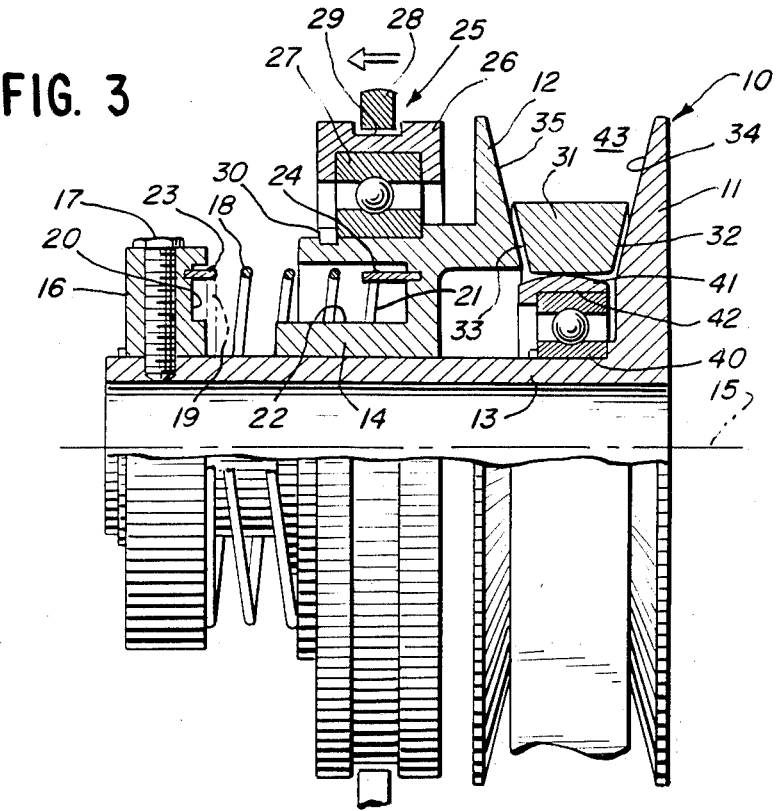

SPEED-SHIFTING PULLEY WITH CLUTCH MECHANISM

DESCRIPTION

1. Technical Field

This invention relates to speed-shifting pulleys and in particular to speed-shifting pulleys having means for disengaging the drive belt from the pulley in a nondrive arrangement.

2. Background Art

In one conventional form of speed-shifting pulley, a stationary sheave is fixed to a sheave shaft. A complementary sheave is slidably mounted for movement longitudinally of the shaft to provide an adjustable spacing between the sheaves for receiving the drive belt therebetween. By moving the adjustable sheave toward or from the stationary sheave, variations in the drive speed may be effected as a result of the V-belt sidewalls engaging the confronting angled sidewalls of the sheaves at different radial distances from the axis of the sheave shaft as a function of said spacing.

It is further conventional to provide an idler member on the sheave shaft for defining a third belt engagement wall at the radially inner end of the space between the stationary and adjustable sheave confronting surfaces. Thus, when the adjustable sheave is spaced sufficiently from the stationary sheave, the radially inner surface of the V-belt may engage the outer surface of the idler element, which may be rotatably mounted on the sheave so as to permit effective stoppage of movement of the belt notwithstanding the continued rotation of the sheave shaft and the stationary and adjustable sheaves thereon.

A vexatious problem, however, has arisen in connection with such adjustable sheave pulleys in that the belt tends to be displaced parallel to the axis of the sheave shaft in the idling arrangement so as to undesirably engage either of the fixed or stationary sheave on one hand, or the adjustable sheave on the other hand. This causes a tendency of the belt to be driven to some extent, which may be at least a vexatious problem, if not a dangerous condition, for it is necessary to assure stoppage of the belt drive for safety purposes, etc.

In one conventional form of such speed-adjusting pulley, the adjustable sheave is resiliently driven by the sheave shaft through a coaxial coilspring having one end fixed to the sheave shaft and the other end fixed to the adjustable sheave. The coil spring may be wound in a direction such that the spring is contracted by the rotation of the device. The ends of the spring may be engaged with the shaft support means and adjustable pulley, respectively, by insertion into recesses formed therein, such as in Japanese Utility Model Publication No. 35412/1977. Alternatively, the ends of the spring may be press-fitted into a tab formed on the elements, such as disclosed in U.S. Pat. No. 4,075,902. It has been found that the inserted ends of the spring often break due to the successive reversible forces applied thereon during normal operation of the pulley drive where inserted into the recesses, or alternatively, the tab means may be deformed or broken similarly by such forces in the second above-discussed arrangement.

DISCLOSURE OF INVENTION

The present invention eliminates this vexatious problem in a novel and simple manner to provide long, troublefree life of the adjustable pulley.

More specifically, the present invention comprehends provision in such a pulley structure of an idler element which is uniquely arranged to cause the drive belt to be effectively centered thereon so as to be maintained free of engagement with either of the confronting surfaces of the fixed or stationary sheave or the adjustable sheave so as to effectively assure a stopped condition of the belt when desired.

In the illustrated embodiment, the idler pulley defines an annular, radially outwardly convex outer surface on which the drive belt rides so as to provide the desired centering thereof between the sheaves in the stopped condition.

Thus, the improved pulley structure effectively prevents breaking of the coil spring ends or connecting tabs notwithstanding the transmission of large torque by the pulley system in use.

Further, the present invention permits the substantial reduction in sliding resistance of the adjustable sheave on the sheave shaft for further improved operation of the pulley system.

In the illustrated embodiment, the coil spring is arranged so as to be unwound by the torque produced during operation of the drive.

The invention comprehends the provision of the idler as a function of a one-way clutch mounted to the sheave shaft.

More specifically, the invention comprehends the provision in a variable speed pulley arranged to be mounted to a torque transmission shaft, including first annular wall means defining one side of a belt receiving pulley groove, second annular wall means defining the opposite side of the belt receiving pulley groove, third annular wall means defining the bottom of the belt receiving pulley groove, means for mounting the first wall means nonmovably coaxially to a torque transmission shaft, means for mounting the second wall means longitudinally movably, substantially nonrotatably, coaxially to the shaft in spaced relationship with the first wall means, means for rotatably mounting the third wall means coaxially to the shaft at the bottom of the annular space to define cooperatively with the first and second wall means a belt-receiving pulley groove, and means for adjustably moving the second wall means longitudinally of the shaft for adjusting the spacing of the second wall means from the first wall means, means associated with the third wall means for urging the belt received in the pulley groove to be effectively centered on the third wall means so as to be free of lateral engagement with the first and second wall means and in engagement only with the third wall means as an incident of spacing of the first and second wall means greater than a preselected amount.

In the illustrated embodiment, the means associated with the third wall means for urging the belt received in the pulley groove comprises an annular, radially outwardly convex outer surface portion of the third wall means defining the surface thereof engaged by the belt.

Further, in one embodiment, the pulley structure includes sleeve means arranged to be coaxially carried by the torque transmitting shaft and coaxially carrying the second and third wall means.

In one embodiment, the fixed sheave, or first annular wall means, is formed integrally with the sleeve and the adjustable sheave, or second wall means, is slidably carried by the sleeve.

In the illustrated embodiment, the sleeve comprises a tubular element coaxially mounted to the torque, or sheave, shaft and locked to the shaft.

The invention comprehends the provision of lubrication means providing a low friction, slidable mounting of the adjusable sheave on the sleeve.

In one embodiment, the tubular support is provided for coaxially carrying the adjustable sheave on the sleeve.

The variable speed pulley of the present invention is extremely simple and economical of construction while yet providing a substantially improved, positive stopped condition of the drive belt, when desired, and long, troublefree life of the drive system.

BRIEF DESCRIPTION OF THE DRAWING

Other features and advantages of the invention will be apparent from the following description taken in connection with the accompanying drawing wherein:

FIG. 1 is a fragmentary diametric section of a variable speed pulley structure of the prior art illustrating the undesirable engagement of the V-belt with the fixed sheave in an intended nondriving arrangement of the pulley system;

FIG. 2 is a fragmentary diametric section illustrating the opposite engagement of the V-belt with the adjustable pulley under such conditions in such prior art pulley system;

FIG. 3 is a side elevation partially in diametric section of an improved variable speed pulley embodying the invention;

FIG. 4 is an enlarged transverse section of an idler embodying the invention;

BEST MODE FOR CARRYING OUT THE INVENTION

Figure 5:
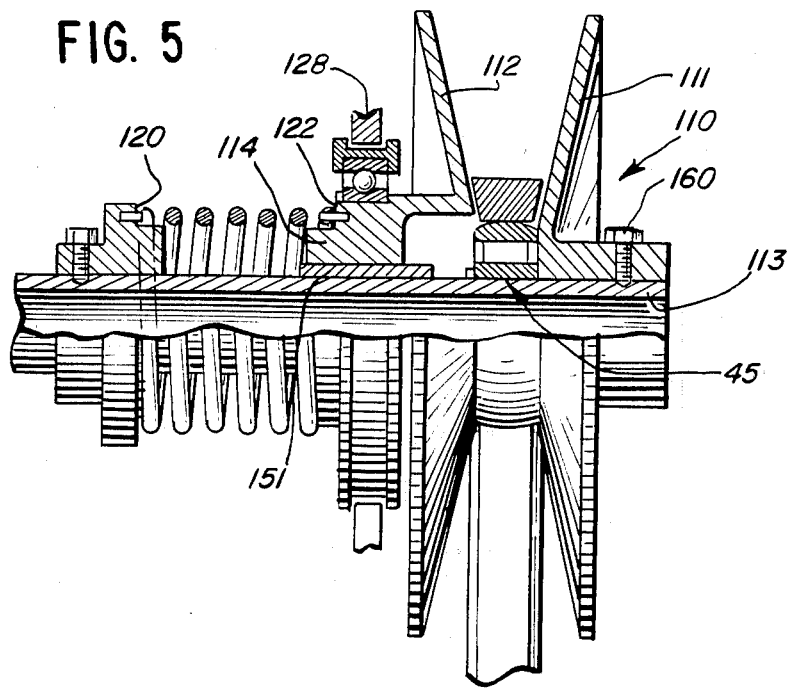
FIG. 5 is a side elevation partially in diametric section of another embodiment of the invention.

In one illustrative embodiment of the invention as disclosed in FIG. 3, a variable speed pulley generally designated 10 is shown to comprise a fixed, or stationary, sheave 11 and an adjustable sheave 12 coaxially mounted on a torque transmitting, or sheave, shaft 13. In the embodiment of FIG. 3, fixed sheave 11 is formed integral with shaft 13, it being understood that sheave 11 may be secured to shaft 13 by any suitable means, as will be obvious to those skilled in the art.

As seen in FIG. 3, adjustable sheave 12 is provided with a mounting portion 14 slidably mounted to sheave 13 for reciprocal movement parallel to the axis 15 of shaft 13.

A collar 16 is fixed to shaft 13 as by a suitable bolt 17. A helical coil spring 18 is compressively received between adjustable sheave 12 and collar 16 for resiliently connecting the adjustable sheave 12 to the collar for resiliently retaining sheave 12 against rotation relative to shaft 13 while allowing ready longitudinal adjustable movement of sheave 12 relative to fixed sheave 11.

As seen in FIG. 3, one end 19 of the spring 18 is received in an annular recess 20 in collar 16, and the opposite end 21 of the spring 18 is received in an opposed recess 22 of the movable sheave mounting portion 14. Spring end 19 is retained against movement in recess 20 by a pin 23 fixed to the collar 16, and spring end 21 is retained by engagement with a pin 24 fixed to the sheave portion 14. As will be obvious to those skilled in the art, other means for securing the spring ends to the respective collar and sheave mounting portion may be utilized within the scope of the invention.

As shown, spring 18 biases adjustable sheave 12 toward fixed sheave 11. Selective positioning of the sheave 12 is effected by a shifting mechanism generally designated 25. Mechanism 25 includes a force transmitting ring 26 mounted to sheave mounting portion 14 by a roller bearing 27. A positioning arm 28 is received in a recess 29 in the ring 26 for applying a force to the sheave 12 parallel to axis 15 of the sheave shaft 13. As spring 18 biases sheave 12 toward sheave 11, the force acting to the left, as seen in FIG. 3, applied through positioning arm 28, tends to overcome the spring biasing force and space sheave 12 adjustably from sheave 11, as desired.

As shown in FIG. 3, bearing 27 may be removably secured to the sheave mounting portion 14 by a suitable locking ring 30.

As indicated briefly above, the pulley is adapted for use with a V-belt, such as power transmission V-belt 31, having opposite converging side faces 32 and 33. Sheave 11 defines an inclined belt-engaging surface 34 adapted to be facially engaged by surface 32 of the belt 31, and sheave 12 defines a complementary inclined belt engaging surface 35 adapted to be engaged by V-belt surface 33. By suitably adjusting the spacing between surface 35 and surface 34, V-belt 31 is caused to be positioned adjustably radially outwardly of shaft axis 15 as desired, so as to provide an adjustable speed ratio corresponding to the effective radius of the engagement of the belt 31 with the pulley 10.

As indicated briefly above, the present invention is concerned with the problem of maintaining the belt surfaces 32 and 33 free of engagement with surfaces 34 and 35 of the sheaves 11 and 12, respectively, in a stopped, or idling, condition of the pulley, such as illustrated in FIG. 3.

As further discussed above, and as shown in FIGS. 1 and 2, the pulley structures of the prior art have heretofore had the vexatious problem of the V-belt tending to engage either of the opposite sheave faces in the stopped or idling condition. Thus, as shown in FIG. 1, the V-belt 31 is engaging the face 36 of the fixed sheave 37, whereas in FIG. 2, the V-belt 31 is engaging the face 38 of the adjustable sheave 39, with the V-belt riding on the idler 40 mounted coaxially to the sheave shaft 13.

The means for causing the V-belt to remain effectively centered on the idler in the present invention comprehends means defining an annular, radially outwardly convex outer surface portion 41 of the idler engaged by the V-belt, as illustrated in FIG. 3. As shown therein, the idler portion 41 may be defined by a ring 42 mounted coaxially to the idler 40. The convex surface portion, or crown, 41 acts to center the V-belt between the sheave surfaces 34 and 35 as a result of the belt being urged against the surface portion 41, thereby effectively preventing engagement of the V-belt side faces 32 and 33 with either of the sheave faces 34 and 35 in the stopped or idling condition of the pulley. Tension may be applied to the belt by conventional means, such as entrainment of the belt over a tension roller, or the like.

Thus, sheave 11 effectively defines a first annular wall forming one side of a belt-receiving pulley groove 43 and sheave 12 effectively defines a second annular wall means defining the opposite side of the groove. Idler portion 41 effectively defines the bottom of the groove 43, and means for effectively centering the V-belt between the groove faces 34 and 35 free of engagement therewith in the stopped arrangement of the pulley system as seen in FIG. 3.

As illustrated in FIG. 4, the crowned surface portion 41 may be formed integrally with the outer race 44 of a modified idler 45 in lieu of providing the separate ring 42, if desired.

Figure 6:
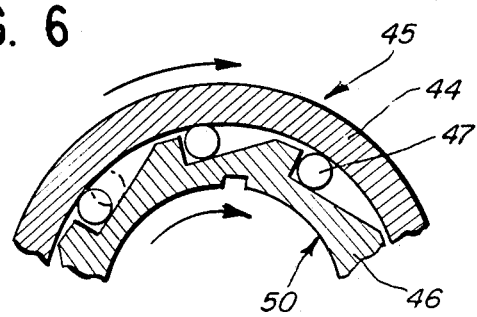
FIG. 6 is a fragmentary transverse section of the one-way cluth idler structure of the pulley system of FIG. 5.
Figure 7:
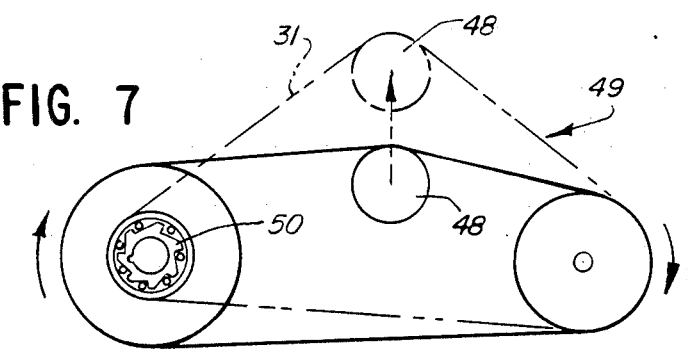
FIG. 7 is a diagrammatic illustration of a drive system utilizing the variable speed pulley of FIG. 5.

As shown in FIGS. 6 and 7, idler 45 may include an inner toothed race 46 receiving roller bearings 47 therein for effectively defining a one-way clutch, permitting free movement of outer race 44 in the direction of the arrows, as seen in FIG. 6, while causing a locked association of outer race 44 with inner race 46 in the opposite direction. As shown in FIG. 7, the V-belt 31 may be entrained over a suitable tension roller 48 in an exemplary drive system 49, utilizing the one-way clutch means 50 illustrated in FIG. 6.

In FIG. 5, a modified pulley arrangement generally designated 110 is shown to comprise a pulley arrangement generally similar to pulley 10. However, as shown in FIG. 5, the fixed sheave 111 is fixedly secured to the shaft 113 by a suitable bolt 160. The third wall means is defined by an idler 45. Movable sheave mounting portion 114 is coaxially slidably mounted on a tubular sleeve 151 coaxially mounted to shaft 113 for facilitated sliding movement of sheave 112 toward and from sheave 111 by the positioning arm 128.

As further shown in FIG. 5, the collar recess 120 opens radially outwardly and the adjustable sheave recess 122 similarly opens radially outwardly. Pulley 110 functions similarly to pulley 10 and all elements thereof similar to corresponding elements of pulley 10 are identified by similar reference numerals except 100 higher.

Figure 8:
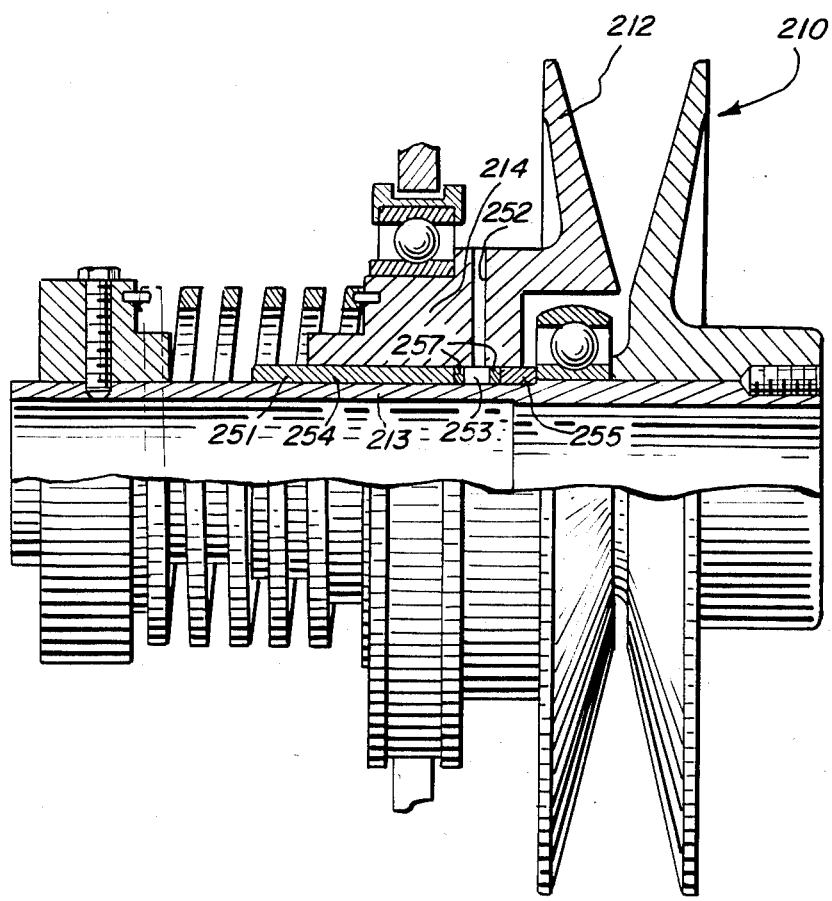
FIG. 8 is a side elevation partially in diametric section of still another embodiment of variable speed pulley embodying the invention.

Referring now to the embodiment of FIG. 8, a further modified variable speed pulley generally designated 210 is shown to comprise a pulley generally similar to pulley 10 and pulley 110, but having improved means for facilitating sliding movement of the movable sheave 212 on the drive shaft 213.

More specifically, as shown in FIG. 8, adjustable sheave mounting portion 214 is slidably mounted on a tubular sleeve 251 coaxially mounted to shaft 213. The sheave mounting portion is provided with a lubrication passage 252 opening radially outwardly therethrough and radially inwardly to an oil groove 253 in the sleeve 251.

More specifically, sleeve 251 may comprise a pair of tubular elements 254 and 255 maintained in axially spaced relationship by suitable locking rings 257, to define the oil chamber 253, as seen in FIG. 8. Thus, lubricating oil may flow from chamber 253 between the sheave mounting portion 214 and the outer surface of the sleeve 251, thereby facilitating rotation and sliding movement of the sheave mounting 214 thereon.

In the illustrated embodiment, the sleeve portions 254 and 255 are formed of a suitable material having low friction, such as a synthetic resin, and illustratively may be formed of nylon having self-lubricating properties. Further illustratively, the sleeve may be formed of a thermosetting resin, such as Bakelite. Still further, the sleeve may be formed of a ferrous material, such as steel or soft iron. Thus, the sleeve may be selectively formed of suitable materials providing low friction with or without the use of lubricant, as desired.

The provision of lubricating oil to chamber 253 and the flow therefrom to between the tubular sleeve 251 and the outer surface of the shaft 213 effectively prevents rusting of the shaft and further assists in maintaining free movement of the sheave 214 relative to the shaft in the normal use of the pulley. Such lubrication effectively avoids the need for protective plating of the shaft outer surface, thereby minimizing the cost of the pulley structure.

In all other respects, pulley 210 is similar to pulleys 10 and 110 as discussed above, and parts thereof corresponding to similar parts of pulley 10 are identified by similar reference numerals but 200 higher.

The idler, as indicated briefly above, may comprise a one-way clutch on the shaft 13,113,213. Where so provided, as in the drive unit of a vehicle, the V-belt may serve to restrict free movement of the shaft, such as when the vehicle is moving downwardly on a slope. Thus, the structure may function as a brake mechanism. Alternatively, when the inner race of the clutch is idled, as by low speed rotation of the shaft, the clutch mechanism is operated in the normal manner.

In each of the different embodiments of the invention, means are provided for effectively maintaining the power transmission belt free of engagement with the confronting sheave surfaces in the stopped or idling arrangement of the pulley. Thus, the present invention provides a substantial improvement over the prior art pulleys wherein wear of the belt and damage of the pulley mechanism has occurred due to the undesired engagement of the belt with either of the pulley sheaves in such stopped or idling conditions. The improved functioning of the present pulley structure is obtained in a novel and simple manner by providing a convex surface portion on the portion of the idler engaged by the belt under such conditions, which unexpectedly effects the desired maintained centering of the belt between the spaced pulley sheaves. The invention further comprehends provision of means for facilitating slidable adjustment of the movable pulley sheave under the biasing action of suitable spring means interconnected between the movable sheave and a collar fixed to the sheave shaft.

The foregoing disclosure of specific embodiments is illustrative of the broad inventive concepts comprehended by the invention.

We claim:

1. In a variable speed pulley arranged to be mounted to a torque transmission shaft, including first annular wall means defining one side of a belt-receiving pulley groove, second annular wall means defining the opposite side of the belt-receiving pulley groove, third annular wall means defining the bottom of the belt-receiving pulley groove, means for mounting said first wall means nonmovably coaxially to a torque transmission shaft, means for mounting said second wall means longitudinally movably, substantially nonrotatably, coaxially to said shaft in spaced relationship with said first wall means, means for rotatably mounting said third wall means coaxially to said shaft at the bottom of said annular space to define cooperatively with said first and second wall means a belt-receiving pulley groove, and means for adjustably moving said second wall means longitudinally of said shaft for adjusting the spacing of said second wall means from said first wall means, the improvement comprising means associated with said third wall means for urging the belt received in said pulley groove to be effectively centered on said third wall means so as to be free of lateral engagement with said first and second wall means and in engagement only with said third wall means as an incident of spacing said first and second wall means apart greater than a preselected amount.

2. The variable speed pulley of claim 1 wherein said means associated with the third wall means for urging the belt received in said pulley groove comprises an annular, radially outwardly convex outer surface portion of the third wall means defining the surface thereof engaged by the belt.

3. The variable speed pulley of claim 1 wherein said means associated with the third wall means for urging the belt received in said pulley groove comprises means fixedly secured against movement relative to said first wall means.

4. The variable speed pulley of claim 1 wherein said means associated with the third wall means for urging the belt received in said pulley groove comprises an annular bearing having an inner race secured to said shaft and an outer race rotatable about said inner race, and an annular crown ring carried by said outer race and defining an annular, radially outwardly convex outer surface portion of the third wall means defining the surface thereof engaged by the belt.

5. The variable speed pulley of claim 1 wherein said means associated with the third wall means for urging the belt received in said pulley groove comprises an annular ball bearing having an inner race secured to said shaft and an outer race rotatable about said inner race, and an annular crown ring carried by said outer race and defining an annular, radially outwardly convex outer surface portion of the third wall means defining the surface thereof engaged by the belt.

6. The variable speed pulley of claim 1 wherein said means for adjustably moving said second wall means comprises a spring having one end fixedly connected to said shaft and an opposite end fixedly connected to said second wall means.

7. The variable speed pulley of claim 1 wherein said means for adjustably moving said second wall means comprises a coil spring extending coaxially of said shaft and having one end fixedly connected to said shaft and an opposite end fixedly connected to said second wall means.

8. In a variable speed pulley arranged to be mounted to a torque transmission shaft, including first annular wall means defining one side of a belt-receiving pulley groove, second annular wall means defining the opposite side of the belt-receiving pulley groove, third annular wall means defining the bottom of the belt-receiving pulley groove, means for mounting said first wall means nonmovably coaxially to a torque transmission shaft, means for mounting said second wall means longitudinally movably, substantially nonrotatably, coaxially to said shaft in spaced relationship with said first wall means, one-way clutch means for rotatably mounting said third wall means coaxially to said shaft at the bottom of said annular space to define cooperatively with said first and second wall means a belt-receiving pulley groove, and means for adjustably moving said second wall means longitudinally of said shaft for adjusting the spacing of said second wall means from said first wall means, the improvement comprising means associated with said third wall means for urging the belt received in said pulley groove to be effectively centered on said third wall means so as to be free of lateral engagement with said first and second wall means and in engagement only with said third wall means as an incident of spacing of the first and second wall means greater than a preselected amount.

9. The variable speed pulley of claim 8 wherein said means for adjustably moving said second wall means comprises a coil spring extending coaxially of said shaft and having one end fixedly connected to said shaft and an opposite end fixedly connected to said second wall means, said spring being arranged to be unwound by torque applied to said second wall means by said belt during torque transmission operation.

10. The variable speed pulley of claim 8 wherein said means associated with the third wall means for urging the belt received in said pulley groove comprises an annular bearing having an inner race secured to said shaft, an outer race rotatable about said inner race, and an annular crown ring carried by said outer race and defining an annular, radially outwardly convex outer surface portion of the third wall means defining the surface thereof engaged by the belt, and sleeve means arranged to be coaxially carried by said torque transmission shaft for coaxially carrying said bearing and slidably coaxially carrying said second wall means.

11. The variable speed pulley of claim 8 wherein said means associated with the third wall means for urging the belt received in said pulley groove comprises an annular bearing having an inner race secured to said shaft, an outer race rotatable about said inner race, and an annular crown ring carried by said outer race and defining an annular, radially outwardly convex outer surface portion of the third wall means defining the surface thereof engaged by the belt, sleeve means arranged to be coaxially carried by said torque transmission shaft for coaxially carrying said bearing and slidably coaxially carrying said second wall means, and means for removably locking said sleeve means to said torque transmitting shaft.

12. In a variable speed pulley arranged to be mounted to a torque transmission shaft, including first annular wall means defining one side of a belt-receiving pulley groove, second annular wall means defining the opposite side of the belt-receiving pulley groove, third annular wall means defining the bottom of the belt-receiving pulley groove, means for mounting said first wall means nonmovably coaxially to a torque transmission shaft, means for mounting said second wall means longitudinally movably, substantially nonrotatably, coaxially to said shaft in spaced relationship with said first wall means, means for rotatably mounting said third wall means coaxially to said shaft at the bottom of said annular space to define cooperatively with said first and second wall means a belt-receiving pulley groove, and means for adjustably moving said second wall means longitudinally of said shaft for adjusting the spacing of said second wall means from said first wall means, the improvement comprising:

means associated with said third wall means for urging the belt received in said pulley groove to be effectively centered on said third wall means so as to be free of lateral engagement with said first and second wall means and in engagement only with said third wall means as an incident of spacing said first and second wall means apart greater than a preselected amount; and sleeve means arranged to be coaxially carried by said torque transmitting shaft and coaxially carrying said second and third wall means.

13. The variable speed pulley of claim 12 wherein said first wall means is formed integrally with said sleeve.

14. The variable speed pulley of claim 12 wherein said second wall means is slidably carried by said sleeve means.

15. The variable speed pulley of claim 12 wherein said sleeve means comprises a tubular element adapted to be coaxially mounted to said torque transmitting shaft and locking means for locking said sleeve to said shaft.

16. The variable speed pulley of claim 12 wherein said sleeve means comprises a tubular element adapted to be coaxially mounted to said torque transmitting shaft and threaded locking means for removably locking said sleeve to said shaft.

17. The variable speed pulley of claim 12 further including lubrication means for providing a low friction slidable mounting of said second wall means coaxially of said sleeve means.

18. The variable speed pulley of claim 12 further including a tubular support coaxially carrying said second wall means on said sleeve means.

19. The variable speed pulley of claim 12 further including a tubular support coaxially carrying said second wall means on said sleeve means and lubrication means for providing a low friction slidable mounting of said second wall means coaxially of said sleeve means on said tubular support.

20. The variable speed pulley of claim 12 wherein said means associated with the third wall means for urging the belt received in said pulley groove comprises an annular, radially outwardly convex outer surface portion of the third wall means defining the surface thereof engaged by the belt, and said means for adjustably moving said second wall means comprises a spring having one end fixedly connected to said shaft and an opposite end fixedly connected to said second wall means.

21. The variable speed pulley of claim 12 wherein said means associated with the third wall means for urging the belt received in said pulley groove comprises an annular, radially outwardly convex outer surface thereof engaged by the belt, and said means for adjustably moving said second wall means comprises a spring having one end fixedly connected to said shaft and an opposite end fixedly connected to said second wall means, said spring being arranged to be unwound by torque applied to said second wall means by said belt during torque transmission operation.

* * * * *